United States Patent [19]

Orth et al.

[11] Patent Number: 4,625,990
[45] Date of Patent: Dec. 2, 1986

[54] IMPLEMENT COUPLER KIT FOR TRACTOR

[76] Inventors: David J. Orth; George E. Love, both of 11506 E. Whitmore Ave., Hughson, Calif. 95326

[21] Appl. No.: 793,082

[22] Filed: Oct. 30, 1985

[51] Int. Cl.$^4$ .................. A01B 59/043; B62D 53/00
[52] U.S. Cl. ................. 280/415 R; 280/460 A; 280/461 A; 280/456 A; 172/247; 172/449; 172/817; 172/830
[58] Field of Search .......... 280/415 A, 415 R, 456 A, 280/460 A, 461 A; 172/247, 248, 253, 271, 449, 817, 830, 828

[56] References Cited

U.S. PATENT DOCUMENTS

| 1,987,052 | 1/1935 | Choate et al. | 172/830 |
| 2,742,841 | 4/1956 | Johnson | 172/449 |
| 4,232,878 | 11/1980 | Moore, Jr. | 172/449 |

Primary Examiner—John J. Love
Assistant Examiner—Donn McGiehan
Attorney, Agent, or Firm—Bielen & Peterson

[57] ABSTRACT

An implement coupler hitch for a mini-tractor having a dump bed and actuating ram for conversion to an implement lift, such as a three-point lift for agricultural implements. The mini-tractor may have a power take-off on a platform for portage of a tank for crop-spraying.

18 Claims, 9 Drawing Figures

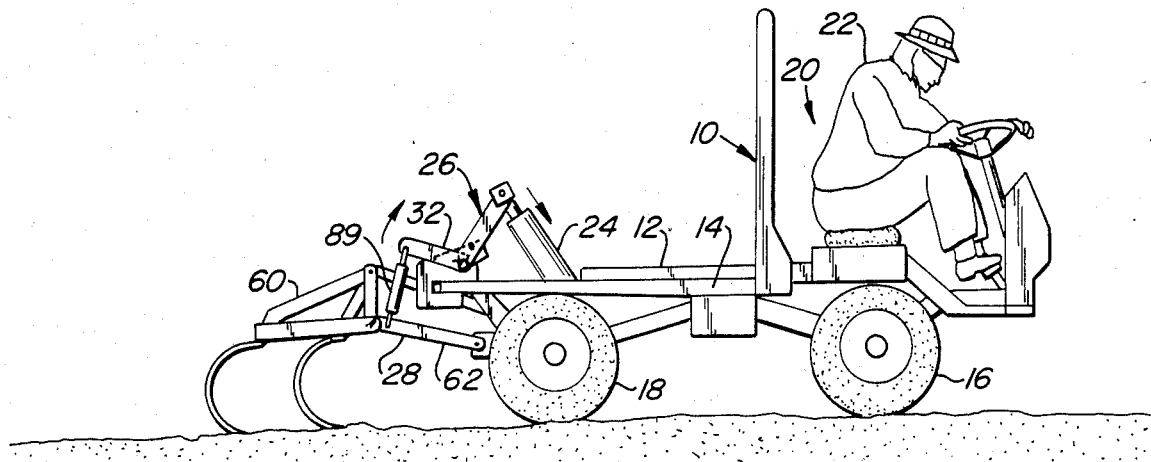
FIG._1.
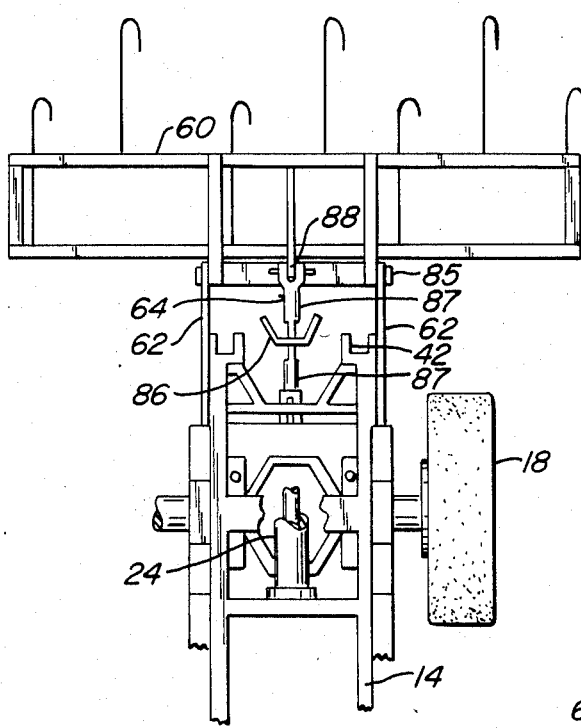
FIG._2.
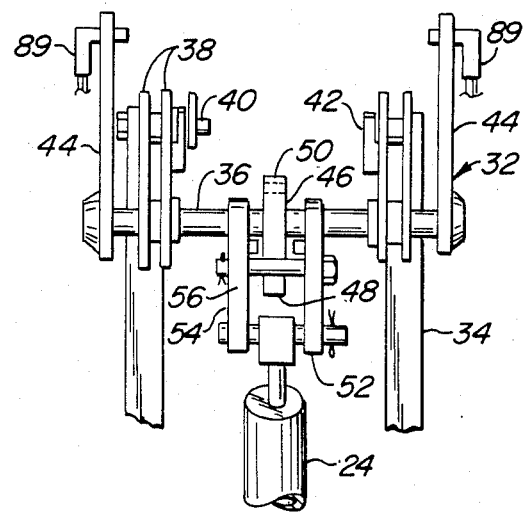
FIG._3.
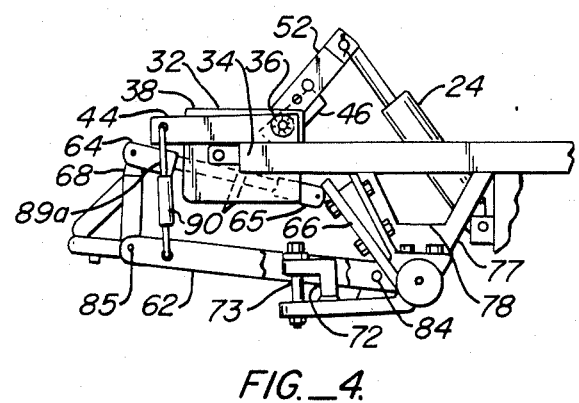
FIG._4.

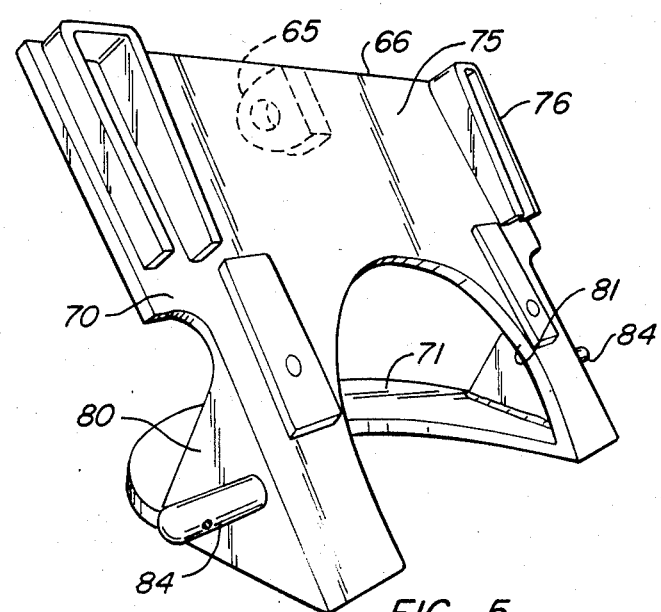
FIG._5.
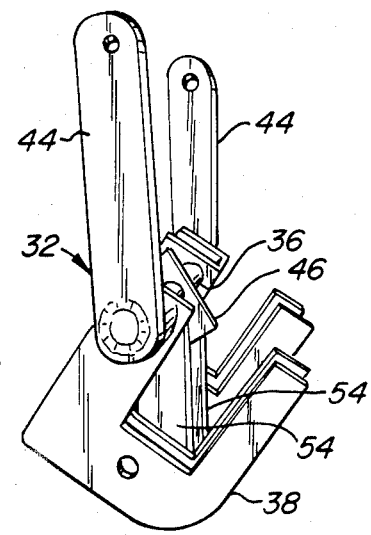
FIG._6.
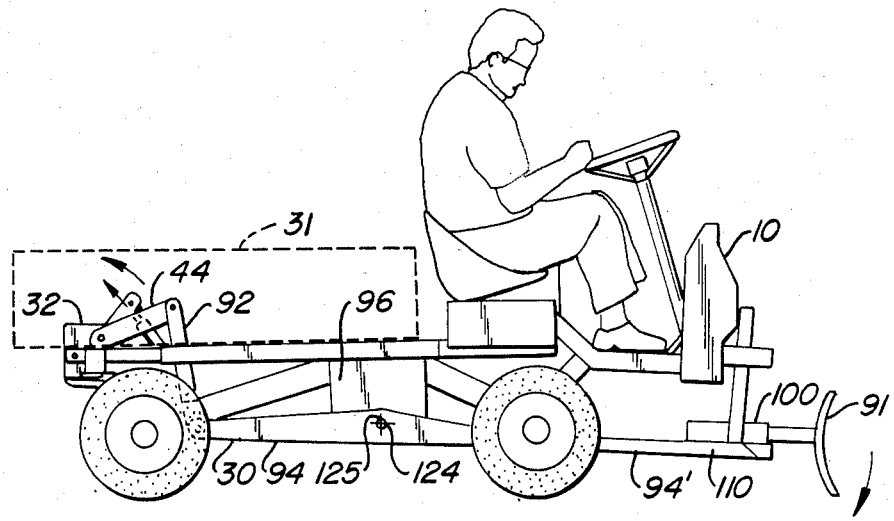
FIG._7.
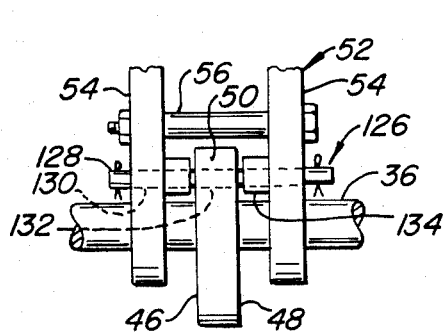
FIG._9.
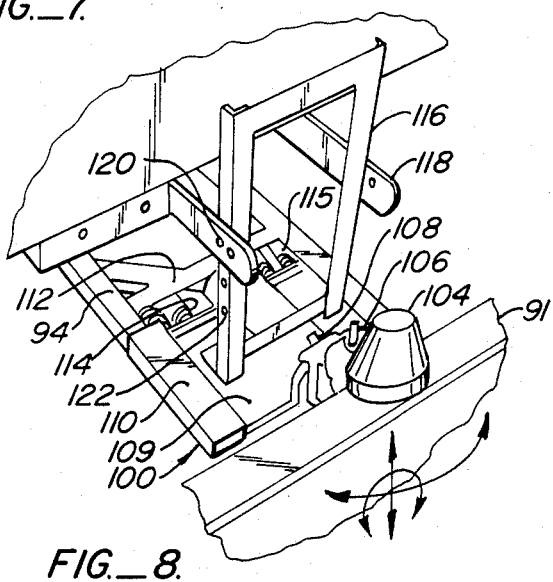
FIG._8.

IMPLEMENT COUPLER KIT FOR TRACTOR

BACKGROUND OF THE INVENTION

The implement coupler kit of this invention enables a carryall minitractor designed for agricultural transport to utilize a dump bed actuating ram as an implement lift, in particular a three point lift for agricultural implements. The minitractor is a four wheel drive agricultural vehicle used to haul materials in a dump bed and tow auxiliary wagons or implements for cultivation and the like. The minitractor has a takeoff power supply and is designed for portage of a spray tank for crop spraying. The minitractor is an all purpose vehicle designated for small farms and utilizes a low power engine with a belt drive to a multigear transmission.

While the vehicle is designed to tow certain farm implements, current state of the art cultivation practices require that many farm implements be raised and lowered by the operator. In this manner, effective use can be made of the implement and the implement can be withdrawn from operation without detachment from the vehicle. Common implements for this practice are a disc, a spring tooth harrow, a plow, a scraper, a rototiller, a lister, and other such implements designed to be lifted from a free floating operating position when not in use. The preferred linkage for such implements is a three point lift including a pair of spaced linkage arms connecting the implement to the tractor and a top link providing a triangulated bracing. Ordinarily, a tractor includes an actuating mechanism integrally designed as an inherent part of the tractor. Here the original hydraulic ram for the tractor's dump bed is adapted to actuate the lift through invented coupler kit.

SUMMARY OF THE INVENTION

The implement coupler kit of this invention comprises an implement coupler that can be added as an auxiliary component to a four wheel drive carryall minitractor that has a factory installed dump bed ram as a convenience feature for its designed haulage capability. The coupler kit adapts a hydraulic dump bed ram to an actuator for a three point implement lift. The coupler kit greatly enhances the agricultural applications of the minitractor and converts a towing and hauling farm tractor to a state of the art minitractor with a three point lift for auxiliary attachments.

The implement coupler kit includes a crank shaft assembly that couples at the rear end of the chassis frame utilizing the pivot brackets and pins of the dump bed mount when the dump bed is removed from the frame. The crank shaft assembly has two pairs of supporting C-plates which connect to the pivot brackets of the chassis frame and rotatably support a cross shaft having a pair of crank arms fixed to the shaft, an inner drive lever rotatably carried on the shaft and a cam unit fixed to the center of the shaft. The drive lever is connected at its distal end to the hydraulic ram of the minitractor and has an interconnecting cross bar spacer between its spaced link members which engages the cam unit on actuation of the ram to rotate the crank shaft and crank arms, with lifting power only, thus allowing the implement to float with the contour of the surface in its lowered position.

The implement kit also includes an anchor bracket that is coupled to the spaced V-bracing connecting the chassis frame to the rear axle. The anchor bracket has a conventional lynch pin and double fulcrum hitch for conventional towing operations. The anchor bracket also has a pair of anchor pins projecting from opposite sides of the anchor bracket for pair of parallel, spaced connecting bars. The connecting bars have first ends pivotally connected to the anchor pins and second distal ends which pivotally connect to similar pivot pins on the auxiliary lift implements. Between the connected ends proximate the distal ends which project from the rear of the mini tractor are lift rods which interconnect the ends of the crank arms with the connecting bars to articulate the connecting bars on actuation of the ram. The anchor bracket also includes a pad eye for a top link having a clevis at one end coupled to the pad eye, and, a clevis at the opposite end coupled to a eye tab on the auxiliary implement positioned above the implement pivot pins to provide a stabilizing triangulation for the three point lift. The top link is adjustable in length by a barrel turn screw to adjust the polar orientation of the implement or to accommodate slightly different three point mounting positions on various auxiliary implements.

Alternately, for front end implements, the crank shaft assembly alone can be utilized for coupling the hydraulic ram to a mini dozer blade positioned at the front of the tractor and connected to the crank shaft assembly by double elongated side trunnions of welded layered design. The side trunnions are pivotally connected to each side of the chassis frame by side plates bolted to the brackets of the transfer case which is positioned midship on the chassis. The tail ends of the side trunnions are connected to the ends of reverse positioned crank arms by connecting lift bars. A safety shear pin through the drive lever passes through a locking hole in the cam unit to prevent the free float operation of the cam drive for direct hydraulic power actuation of the dozer blade in both the up and down directions. Although the anchor bracket is not employed for any connecting linkage when the dozer blade is attached and utilized, the hitch feature may be used, for example, with a drag chain for grading or scraping operations. With the dozer blade trunnion secured in the up position by security pins passing through holes through a side thrust yoke and the lift bars detached from the crank arms, the crank shaft assembly can be connected to the three point lift for attaching of rear end implements without removal of the blade.

The implement coupler is advantageously used with a variety of implements such as a disc, a spring tooth harrow, a plow, a cultipacker, a lister, an independently powered rototiller or snow blower as well as a dozer blade or low rise front fork.

BRIEF DESCRIPTION OF THE DRAWINGS

FIG. 1 is a side view of the minitractor with the implement coupler kit and a three point lift assembly for cultivation implements.

FIG. 2 is a segmented top view of the lower portion of the tractor chassis and coupled lift assembly.

FIG. 3 is a segmented top view of the upper portion of the tractor.

FIG. 4 is a segmented side view of the chassis and connected three point lift assembly.

FIG. 5 is a perspective view of the anchor plate.

FIG. 6 is a perspective view of the crank shaft assembly.

FIG. 7 is a side view of the minitractor with the implement coupler kit and a front end lift assembly for front end implements.

FIG. 8 is a segmented perspective view of the front end blade assembly.

FIG. 9 is an enlarged fragmented view of shear pin unit for the front end lift assembly.

DETAILED DESCRIPTION OF THE PREFERRED EMBODIMENTS

Referring to FIG. 1 of the drawings, the four wheel drive minitractor 10 is shown with a dump bed removed, and a simple platform 12 installed on a chassis 14. The chassis has fore and aft wheels, 16 and 18, and an open cab 20 with an operator 22 to illustrate the small size of the minitractor 10. The light weight minitractor 10 is particularly useful on small farms or for a form of microagriculture utilizing intensive crop methods with minimum soil compaction.

Although originally designed for towing and portage, for example towing cultivation implements or wagons and carrying produce, materials and equipment such as spray tanks and the like, the minitractor is ideally suited to be modified to a three-point-lift tractor for use with modern agricultural implements. This suitability is particularly founded in the tracking alignment of fore and aft wheels, and the four wheel drive capability which enables accurate control of the vehicle in soft soil.

Key to the adaptation of the minitractor 10 to a three-point-lift tractor is the use of the hydraulic power ram 24 for the dump bed of the original tractor with a coupler kit 26 that converts the ram to an actuator for an implement lift. The coupler kit 26 couples the ram 24 to a three point lift assembly 28 for cultivation implements behind the tractor and a front lift assembly 30 for grading and lifting implements in front of the tractor as shown in FIG. 7. The dump bed 31 shown in phantom in FIG. 7 is also removed on connecting the front lift assembly 30.

Referring first to the three point lift assembly 28 shown in FIGS. 1–4 the coupler kit 26, includes a crank shaft assembly 32 which connects to the rear end of the chassis frame 34. The crank shaft 36 is rotatably mounted between two spaced pairs of C-plates 38 which slidably engage and couple to the chassis frame 34 as shown in FIGS. 3 & 4. The C-plates 38 are bolted to the frame by bolts 40 which insert through the chassis frame pivot brackets 42, originally used for the dump bed. Fixed to the crank shaft 36 are two spaced crank arms 44, which deliver the lift action to a connecting linkage for the auxiliary implements. Also, fixed to the center of the crank shaft 36 is a unitary cam and pad eye unit 46, with a cam 48, used in the three point lift assembly, and a pad eye 50 used in the front end lift assembly as later described with reference to FIG. 9.

Rotatably connected to the center of the shaft is a drive lever 52, which is formed by a pair of side links 54 as shown in FIG. 6, positioned on each side of the cam and pad eye unit 46.

The drive lever 52 is connected at its distal end to the piston rod 55 of the ram and has a cross bar spacer 56 which spaces the side links 54 and engages the cam 48 on contraction of the ram, thereby rotating the cam shaft and pivoting the crank arms. The one way transmission of power from the ram to the crank shaft is desired for a three point lift assembly. This actuation enables implements connected behind the tractor to be lifted and lowered, yet be free floating in the lowered position, for example, to freely rise if the implement strikes a rock or encounters an uneven surface.

The three point lift assembly couples to an auxiliary implement 60 such as the spring harrow shown, by a connecting linkage which comprises a pair of spaced, parallel connecting bars 62, and an adjustable top link 64. The connecting bars 62 and the top link 64 are pivotally connected at one end to an anchor bracket 66 on the chassis and at the other end to an A-frame brace 68 on the auxiliary implement 60.

The anchor bracket 66, shown in FIGS. 4 & 5, 66 is an angular shaped plate 70 having a horizontal portion 71 with a double fulcrum hitch 72 and a lynch pin 73 for towing auxiliary vehicles or implements; a sloped mounting portion 75 with spacers 76 which is coupled to the rear tractor axle bracing 77 by bolts 78; and, side portions 80 bracing the horizontal portion 71 and sloped portion 75. The sloped mounting portion has an arched opening 81 to accommodate the rear axle differential case (not visible) and supports a pad eye 65 for pivotally anchoring the top link 64. From the side brace portion 80 project a pair of pivot pins 84 which pivotally engage the ends of the connecting bars 62. Similar pins 85 on the A-frame brace 68 engage the opposite ends of the connecting bars 62 to connect the implement to the chassis. The top link 64 has a center turn screw 86 for adjustment of the length of the top link and a connecting clevis 87 at each end, one engaging the lug eye 65 on the anchor bracket 66 and the other engaging an eye tab 88 on the top of the A-frame brace 68 of the implement.

To connect the connecting linkage to the crank shaft assembly, the connecting linkage includes a pair of lift rods 89 connecting the end of the crank arms 44 to the connecting bars 62 proximate the end for maximum leverage. One of the lift rods 89A has a turn buckle 90 to adjust the level of the connected implement. The top link 64 is similarly adjustable by the turn screw 86 to adjust the angular orientation of the implement and triangulation of the three-bar linkage. In this manner a variety of implements can be attached even though the implements have some variations in the connecting structure.

When the minitractor 10 is adapted to outfit front end implements, such as the mini dozer blade 91 assembly shown in FIGS. 7 & 8, the crank shaft assembly 32 is rotated approximately 180° and coupled to a connecting linkage comprising a pair of lift bars 92 attached at one end to the crank arms 44 and at the opposite ends to a pair of spaced, elongated side trunnions 94 pivotally connected to a mounting plate 96 attached to the mid chassis transfer case brackets (not visible). The trunnions 94 extend from the rear of the tractor where they connect to the lift bars 92 to the front of the tractor where they connect to the blade assembly 100.

The blade assembly 100 includes the blade 91 coupled to a swivel and tilt mechanism 104 which enables the blade to be swivelled and/or tilted by select placement of locking pins 106 and 108. The swivel and tilt mechanism 104 has a support plate 109, that is slide mounted into a receiving frame 110 at the end of the trunnions. The blade assembly 100 is cushioned against a cross bar 112 on the receiving frame 110 by four high compression springs 114 with tubular receiving sockets 115. In this manner irregular dynamic shock and vibration generated in plowing are cushioned and absorbed, relieving the trunnions 94 and mounting plate 96 from peak stresses and vibrations. Mounted on the support plate 109 of the swivel and tilt mechanism is a guide harness 116 which is arranged between a projecting yoke 118 on the tractor frame to prevent lateral displacement of the blade assembly 100, for example, if the outside edge of the blade 91 catches a rock and places a lateral stress on the trunnions.

The yoke 118 has one or more pin holes 120 which match the holes 122 in the guide harness for retaining the blade in a raised position upon inserting a pair of pins (not shown) through select matched holes. In this raised and locked position, the lift bars 92 connecting the front end implement to the crank shaft assembly 32 can be removed. The crank shaft assembly is thereby free to connect to other implement linkage without removal of the blade assembly and trunnions. Removal of the blade assembly 100, is easily accomplished. It requires less than ten minutes to detach the lift bars and remove the click pin 125 and pull the pivot bolt 124 for the trunnions and back the tractor over the detached assembly, thereby separating the entire blade assembly from the tractor.

The blade assembly, when connected to the crank shaft assembly, is coupled by a locking unit 126 to provide direct action on lifting and lowering. This is accomplished by means of a shear pin 128 which passes through a hole 130 in the drive lever 52 and a hole 132 in the pad eye 50 of the cam and pad eye unit 46. A pair of shear blocks 134 on each side link 54 of the drive lever 52 bracket the pad eye 50 as shown in FIG. 9, and shear the pin 128 if excessive stress is encountered that would endanger the ram or connecting linkage.

While the dozer blade and spring tooth harrow are shown as the exemplar implements of the preferred embodiments, it is to be understood that numerous other front end and rear end implements may be utilized with minor adaptations, if any, to the connecting structure shown.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a minitractor having a chassis frame for mounting a removable dump bed, a hydraulic pump bed ram connected to the chassis frame for operating the dump bed, an implement coupler kit adapted to couple the hydraulic ram of the minitractor to auxiliary implements when the dump bed is removed from the minitractor for lifting and lowering the auxiliary implements by actuation of the hydraulic ram comprising:
    a. a crank shaft assembly coupled to the rear of the minitractor chassis frame with the dump bed removed and connecting linkage means connecting the crank shaft assembly to the auxiliary implements for raising and lowering the implements wherein said crank shaft assembly includes:
      1. a bracket with means for rigidly mounting the bracket on the chassis frame proximate the hydraulic ram,
      2. a crank shaft rotatably mounted on the bracket,
      3. a drive lever having a first end rotatably mounted on the crank shaft and a second end connected to the hydraulic ram,
      4. coupler means operably connecting the drive lever to the crank shaft for transmitting actuations of the hydraulic ram to rotations of the crank shaft,
      5. at least one crank arm having a first end fixed to the crank shaft and a second distal end coupled to the connecting linkage means to transmit partial rotations of crank shaft to substantially linear motions in the connecting linkage means.

2. The implement coupler kit of claim 1 wherein said coupler means comprises a cam unit fixed to the crank shaft and a cross bar member fixed to the drive lever, the cross bar member contacting the cam unit on actuation of the ram for one way transmission of power from the ram to the crank shaft, wherein the cam unit and crank arms are positioned, and the connecting linkage arranged such that the auxiliary implements are lifted and lowered and freely float in the lowered position.

3. The implement coupler kit of claim 2 wherein the connecting linkage means comprises a three point lift assembly for coupling an auxiliary implement at the rear of the minitractor to the crank shaft assembly.

4. The implement coupler kit of claim 3 wherein the three point lift assembly includes:
    a. a mounting structure fixed to the chassis frame below the bracket of the crank shaft assembly, the mounting structure having two spaced bottom mounts and a central top mount,
    b. a pair of connecting bars each having a first end pivotally connected to the bottom mounts and a second distal end pivotally connected to a connecting element on the auxiliary implement,
    c. a top link having a first end pivotally connected to the top mount and a second end pivotally connected to a connecting element on the auxiliary implement, and
    d. a connecting means connecting the crank arm of the crank shaft to the connecting bars for lifting and lowering the connecting bars and the connected auxiliary implement.

5. The implement coupler kit of claim 4 wherein the crank shaft assembly has two spaced parallel crank arms, each having a first end fixed to the crank shaft and a second distal end coupled to the connecting linkage means wherein the connecting linkage means includes a pair of lift rods each having a first end connected to the distal end of a crank arm and a second end connected to the connecting bars between the first and second connected ends.

6. The implement coupler kit of claim 5 wherein the connection location of the lift rods and the connecting bars is proximate the distal ends of the connecting bars.

7. The implement coupler kit of claim 4 wherein the top link is adjustable in length.

8. The implement coupler kit of claim 1 wherein the chassis frame has rear end brackets for pivotally coupling a dump bed to the minitractor and said crank shaft assembly bracket is secured to said rear end brackets.

9. The implement coupler kit of claim 4 wherein the mounting structure of said three point lift assembly includes a tow hitch unit for conventional towing of auxiliary implements.

10. The implement coupler kit of claim 1 wherein said coupler means comprises a locking unit with a first member fixed to the crank shaft and a locking element engaging the drive lever wherein the drive lever is fixedly attached to the crank shaft for two way direct transmission of power from the ram to the crank shaft whereby implements are lifted and lowered without freely floating.

11. The implement coupler kit of claim 10 wherein the connecting linkage means comprises a front end lift assembly for coupling an auxiliary implement at the front of the minitractor to the crank shaft assembly.

12. The implement coupler kit of claim 11 wherein the front end lift assembly includes:
   a. pair of elongated parallel side trunnions extending under the minitractor chassis frame with a front end extending to the front of the minitractor and a tail end extending proximate the rear of the minitractor said side trunnions having means centrally located thereon for pivotally connecting the trunnions to the chassis frame,
   b. means for connecting the tail ends of the elongated trunnions to the crank arm for raising and lowering the tail ends of the trunnions in unison on actuation of the ram,
   c. means for coupling the front ends of the trunnions to an auxiliary implement for raising and lowering the implement on pivot of the trunnions by actuation of the ram.

13. The implement coupler kit of claim 12 wherein the crank shaft assembly has two spaced parallel crank arms, each having a first end fixed to the crank shaft and a second distal end coupled to the connecting linkage means wherein the connecting means of the tail ends of the elongated trunnions comprise a pair of lift bars each having a first end connected to the distal end of the crank arm and a second end connected to the tail end of a trunnion.

14. The implement coupler kit of claim 13 wherein the means for coupling the front ends of the trunnions to an auxiliary implement comprises a frame structure interconnecting the front ends of the trunnions, said frame structure having a guide structure and an implement support slide plate which slidably engages the guide structure, the frame structure including cushioning means for cushioning slide action of the slide plate in the guide structure.

15. The implement coupler kit of claim 13 wherein the front ends of the trunnions have an interconnection structure and cooperating means on the interconnection structure and the chassis frame for guiding lifting and lowering of the front ends of the trunnions and restricting lateral movement of the interconnection structure.

16. The implement coupler kit of claim 15 wherein the cooperating means comprises a vertically extending guide harness on the interconnection structure and a pair of projecting guide brackets on the chassis frame bracketing the guide harness.

17. The implement coupler kit of claim 16 wherein the guide harness and guide brackets have alignable holes and have locking pins engageable in the alignable holes wherein on engagement of the pins in the holes the trunnions are locked in position.

18. The implement coupler kit of claim 10 wherein the locking element comprises a shear pin which is sheared on excessive stress between the crank shaft member and the locking element.

* * * * *